Sept. 4, 1962 W. FERRELL ETAL 3,051,995
MANUFACTURE OF PRODUCTS FROM PLASTISOLS
Filed Aug. 15, 1957 4 Sheets-Sheet 1

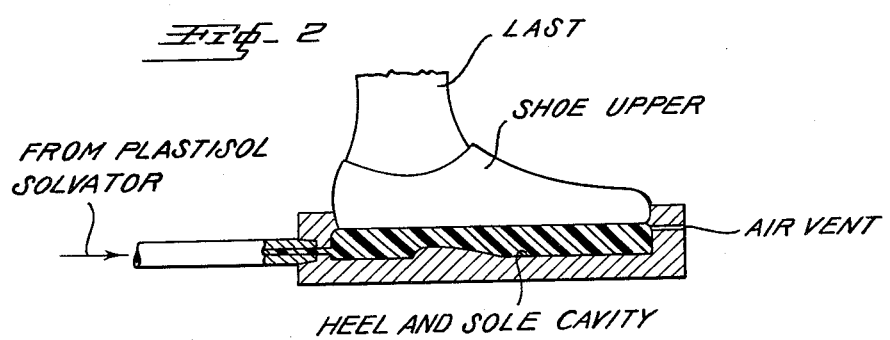
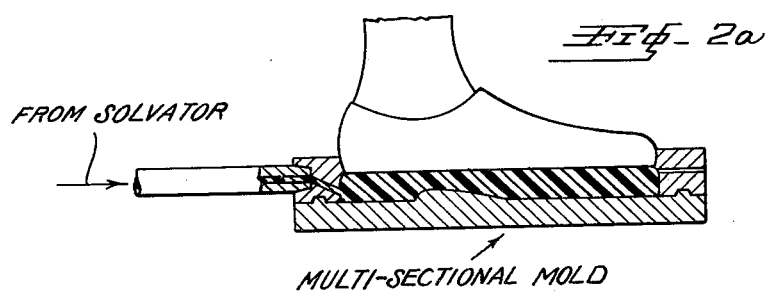
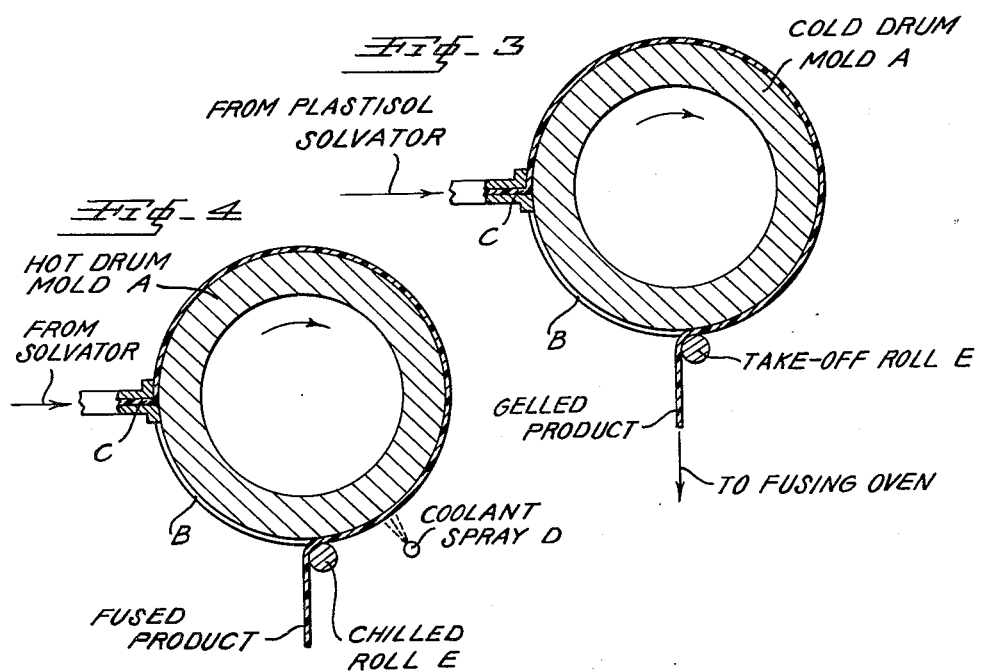

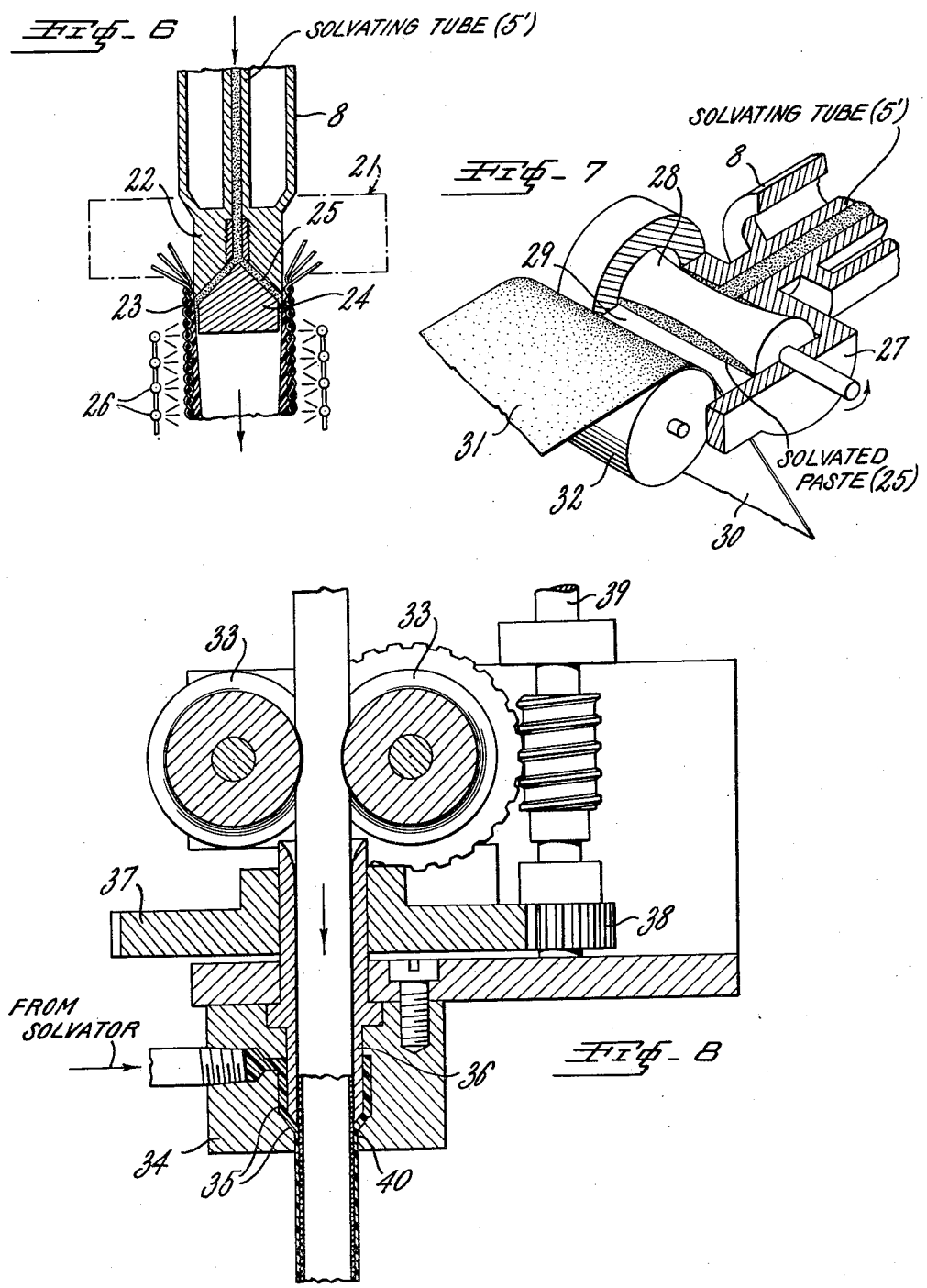

Sept. 4, 1962 W. FERRELL ETAL 3,051,995
MANUFACTURE OF PRODUCTS FROM PLASTISOLS
Filed Aug. 15, 1957 4 Sheets-Sheet 4

United States Patent Office 3,051,995
Patented Sept. 4, 1962

3,051,995
MANUFACTURE OF PRODUCTS
FROM PLASTISOLS
Wesley Ferrell, Fair Lawn, Valmar Fournier, Wallington, and Mark W. Olson, Allendale, N.J., assignors to United States Rubber Company, New York, N.Y., a corporation of New Jersey
Filed Aug. 15, 1957, Ser. No. 678,403
12 Claims. (Cl. 18—55)

This invention relates to a new and useful means and method in the art of molding plastic articles, and more specifically to and for the employment of a hot, solvated plastisol paste therein.

A plastisol is a two phase fluid mixture of a thermoplastic resin in the form of a powder dispersed in a preselected amount of plasticizer. It may be suitably stabilized by any known stabilizer therefor to keep it in stabilized condition for further processing. One of the most common methods of making polyvinyl chloride articles is to employ a dispersion of polyvinyl chloride in a plasticizer such as dioctyl phthalate (DOP). To form a solid object, a mold is filled with this liquid plastisol and heat is applied. When heat is applied to a plastisol, the viscosity at first begins to decrease and then begins to rise until it becomes infinite, that is, until the material has gelled. After gelation, the gelled material must be further heated to effect fusion, and then cooled to facilitate removal from the mold.

Another method known to the art is the procedure whereby plastic articles are formed by the extrusion of preheated and prefused plasticized polyvinyl chloride through a properly shaped extrusion die. By this method, it is difficult to produce irregular shaped products with sharp details because the fused material drags on the die lands and swells on issuing.

Still another application employing liquid plastisols is in the coating of fabrics. The plastisol is spread on the fabric which is then heated to effect fusion of the coating. The entire operation is quite sensitive and is limited to a narrow selection of fabrics. If the plastisol is thin or the fabric open, strike-through will occur. If opposite conditions exist, insufficient bonding results.

We have discovered that a plastisol, in which the resin particles are but partially solvated by the plasticizer fluid, may be heated to a temperature where solvation is rapid and gelation normally occurs without undergoing gelation provided there is suitable agitation. We have further discovered that the paste-like substantially unexpanded material thereby obtained may readily be employed in various manners in the manufacture of useful products as hereinafter described.

Reference to the accompanying drawing will more fully explain our method of making, and using, the plastisol.

FIG. 2 illustrates, in cross-section, the application of solvated plastisol to a one-piece mold.

FIG. 2a illustrates, in cross-section, the application of solvated plastisol to a multi-sectional mold.

FIG. 3 illustrates, in cross-section, the manufacture of linear product through the use of a cold drum mold.

FIG. 4 illustrates, in cross-section, the use of a hot drum mold.

FIG. 6 shows, in cross-section, a spreading head for applying a solvated plastisol lining to a woven hose.

FIG. 7 shows a perspective view, partially in cross-section, of a spreading head for coating fabric sheeting.

FIG. 8 illustrates a method of coating solvated plastisol on the surface of woven hose, and apparatus, partially in cross-section, for so doing.

Figure 1:
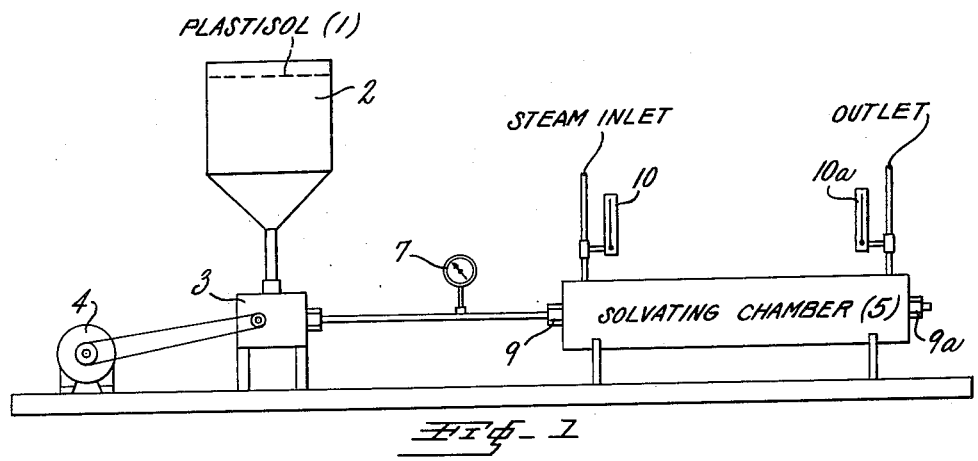
FIG. 1 shows an apparatus suitable for solvating plastisol while preventing gelation.
Figure 1A:
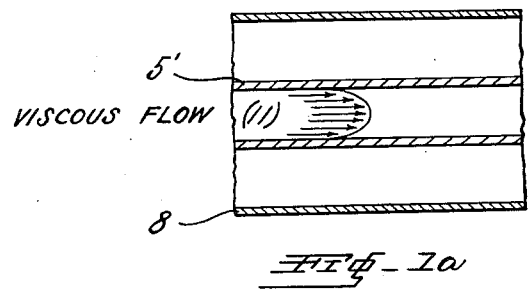
FIG. 1a shows a longitudinal cross-section through the solvating chamber of FIG. 1.

As shown, the plastisol 1 is contained in a reservoir 2 and is pumped through the solvating chamber 5 containing a solvating tube 5' by a metering type gear pump 3 which is driven by a suitably geared down motor. Pumping is under pressure sufficient to cause turbulent flow or agitation of the plastisol. A satisfactory pump for this purpose is a Zenith gear pump which can be relied upon to deliver at a constant rate regardless of the pressures imposed on it by the pressure system. Pressures developed by the pump are indicated on pressure gauge 7.

The solvating tube 5' is preferably a long, small-diameter, length of stainless steel tubing surrounded by a steam jacket 8 fitted with packing glands 9 and 9a. The agitated plastisol traveling through the solvating tube is heated with steam at a predetermined steam pressure in the jacket surrounding the tube. Temperatures imposed to heat the plastisol are indicated by thermometers 10 and 10a.

Applying heat to a plastisol promotes solvation which normally converts the initial pourable fluid into a relatively stiff single phase gel. However, the high shear rates impressed on the plastisol resulting from the viscous or turbulent flow 11 of the pumped material in the small solvating tube counteracts or prevents gel formation. Instead, under proper conditions of temperature and agitation, a fully solvated, smearable paste issues from the solvating tube. This paste will set to a stiff gel when the shearing action is arrested.

The length, internal diameter, and temperature of the solvating tube are dependent upon many factors. The length is based upon the need to deliver solvated paste which approaches very closely the temperature of the tube itself. The internal diameter must be small enough to develop necessary shear rates but not so small as to cause excessively high operating pressures. The temperature of the tube is dependent upon the solvating properties of the plasticizer incorporated in the plastisol to be processed. It must approach but not equal the temperature which causes the material to begin to fuse.

A solvating tube 6 ft. long with a .117" internal diameter was found to be a practical selection for processing plastisols at rates between 15 and 45 grams per minute. For plastisols made with DOP plasticizer the optimum temperature of the solvating tube was found to be 238° F. For plastisols made with Plastolein 9058 [1] plasticizer the proper solvating tube temperature was determined to be 295° F. Changing resin-plasticizer ratios requires slight adjustments in these temperatures.

Satisfactory solvated plastisol paste may also be produced in a heated mechanical mixer designed to insure that gelation does not occur. A mixer of this type should be desgned with small internal clearances so that turbulent flow is maintained throughout.

In this invention, advantage is taken of the ability to heat a plastisol mixture to where substantially com- ---
[1] Dioctylazalate marketed by Emery Industries, Inc.

plete solvation takes place while avoiding gelation by suitable agitation. In this manner a thick uniform paste is possible, which can be set, when desired, when agitation is arrested.

Various embodiments of the invention have application in the following areas of plastics production.

A—Manufacture of mold-fused products.
B—Manufacture of mold-gelled products.
C—Open mold production.
D—Continuous die-formed production.
E—Coating fabrics.

A—Mold-Fused Product Applications

It is desirable in many instances to fully fuse the shaped plastic article within a mold and to cool it before removing it from the mold. Previously, in a process for manufacturing canvas footwear, the canvas upper built on a last, is positioned in an integral heel and sole mold to form a suitable cavity therewith. Cold liquid plastisol is then injected into the mold, which mold has been preheated to help reduce the operating cycle, and the plastisol heated until it is fused in place against the canvas upper. At the proper time the mold is cooled until the product is in condition to be stripped from the mold. It is then simply removed from the last and the cycle is repeated.

If, instead, the invention of processing with the ungelled plastisol paste is employed, as shown herein, there is a definite advantage over the above described process. As soon as the paste is injected into the mold, it immediately gels in place and can be heated to the fusing temperature much more rapidly than the cold liquid plastisol, thereby considerably shortening the molding cycle.

Since the plastisol paste gels almost immediately upon contacting the mold, the leakage problem is substantially reduced. This problem is especially aggravated in the prior case of the use of cold liquid plastisol since there is an initial lowering of viscosity of the liquid plastisol immediately upon heatng.

B—Mold-Gelled Product Applications

Certain products of plasticized polyvinyl chloride can be made by heating plastisol in the shape desired until gelation occurs after which the gelled product is removed from the mold and is transferred to an oven to be fully fused. With a multisectional mold, shown in FIG. 2a as a two-part mold, referred to below, the canvas shoe described above could be made in this manner, in which the molding cycle involves the time required to heat the liquid plastisol until it gels followed by the time required for cooling until the preform is stiff enough to remove from the mold.

However, by filling a cold mold with preheated solvated plastisol paste, according to this invention, the molding cycle would consist only of the time required to cool the preform. The plastisol paste as herein described will gel almost immediately after agitation of the mass is arrested such as occurs in a mold after being completely filled.

FIGURES 2 and 2a illustrate footwear manufacture under, respectively, applications A, and B, above; that is, internal molding under A, and multisectional mold application under B. The fully fused and cooled product can be stripped from the mold. The mold must be removed from the gelled product, however, without distorting the gel and therefore is usually segmented. The gelled product is fused by heating at 300–400° F. in an oven.

C—Open Mold Applications

By employing smearable plastisol paste, according to this invention, instead of liquid plastisol, it is possible to fill an open mold regardless of its position relative to the horizontal plane. The use of solvated paste, therefore, makes it possible to make preformed shapes in a continous operation with the use of the paste producing solvating tube of FIGURE 1, and a cold rotatable drum containing one or more open mold cavities disposed thereon, of the shape desired, to receive the paste. Before making a complete revolution the gelled and cooled preform is stripped from the mold in a continuous operation. The gelled object can then be fused in an oven as described under B previously.

Figure 9:
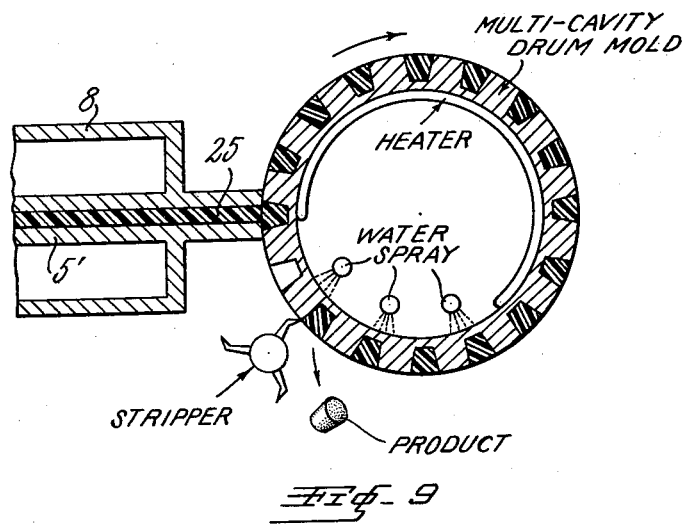
FIG. 9 illustrates the use of a rotatable drum containing a plurality of molds disposed along its perimeter, the drawing being in vertical cross-section.

If a heated rotatable drum were used, it would allow fusing the product in place on the drum, and by cooling with water spray or other suitable means applied at a following position before the drum makes a complete revolution, the cooled fused product, in the shape of the mold cavity, can be stripped continuously from the mold cavity as a finished product. This is illustrated in FIGURE 9.

Referring to FIGURES 3 and 4, a method of producing a continuous linear product is shown. The revolving drum (A) contains an undercut (B) into which is fed plastisol paste from the solvator exit (C) as the drum revolves. In FIGURE 3, the drum is hot and causes the product to fuse in place whereupon it is then cooled by coolant spray (D) and taken off by chilled take-off roll (E). FIGURE 4 is the same, except that the drum is cold, causing the plastisol to gel in place and the fusing is done after the gelled product is taken off. There is, of course, no need here for a coolant spray. It is apparent from this that sesveral molds may be spaced along the drum instead of one continuous mold.

D—Continuous Die Forming Applications

Fexible polyvinyl chloride has proven itself to be a popular and versatile material in the form of cord tubing, shaped strips, wire insulations, etc. Currently, most of these products are being made by an extrusion method. We have discovered a new method of making products of this type from the plastisol paste which is new and novel and which has several advantages over the presently used extrusion method.

Figure 5:
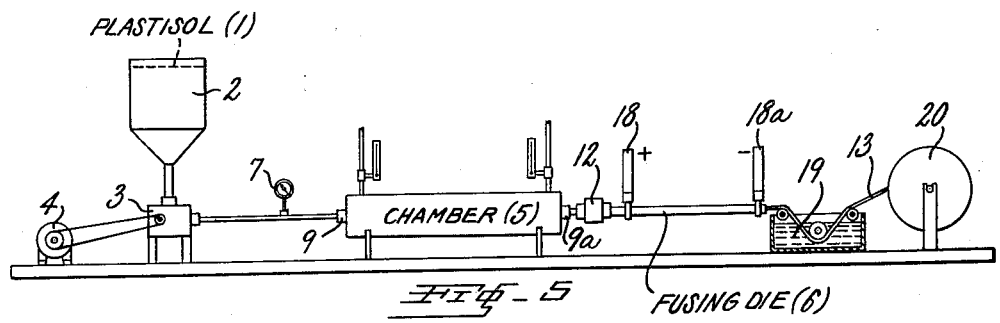
FIG. 5 illustrates an apparatus for continuously solvating, shaping, and fusing linear products.
Figure 5A:
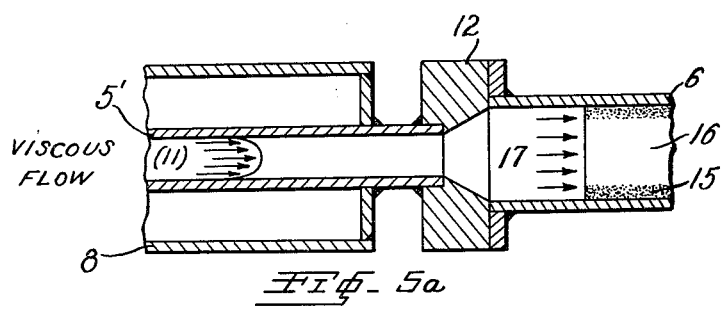
FIG. 5a shows a longitudinal cross-section through the solvating chamber, connecting tapered fitting, and fusing die of FIG. 5.

The new and novel method consists of pumping plastisol through a long, small-diameter, solvating tube, as hereinbefore described, to which is attached a hot, shaped, and moderately long fusing die. FIGURE 5 shows the several parts of the extended set-up and their relationship one to the other. FIGURE 5a shows certain parts in cross-section. When properly operating, a fully fused product issues from the die incorporating the exact dimensions of this product-forming part.

After the paste has been produced, the final steps in this process comprise fusing the plastisol in a fusing die 6 from which the product issues at the preselected rate. The entrance of the die is a transition zone in which the solvated paste is molded to the shape of the final product. This transition zone must be designed to prevent gelation from occurring and for this same reason must be maintained at approximately the temperature of the solvating tube. The transition zone of the set-up shown in FIGURE 5 consists only of a fitting 12 with a tapered internal diameter which connects the solvating tube 5′ with a slightly larger fusing tube or die 6.

The fusing die proper 6 incorporates a long land shaped to the dimensions of the desired end product 13. In it, viscous flow is arrested by the application of high heat to the surface of the solvated paste. The high heat applied to the paste in the fusing die (generally from 350° F. to 500° F.) causes the skin 15 on the ultimate product to fuse and soften. This reduces the shear forces on the paste at the core 16 of the product causing it in turn to set up to a stiff gel. Under these conditions the product starts sliding on the die lands and plug type flow 17 results. Heat may be generated in the ¼″ tubing die chosen, by passing a controlled amount of electrical current through the length where heat is desired. Electrical leads 18 and 18a are indicated.

The length of the fusing die is based upon the need for heat to penetrate to the core and fully fuse the product after the skin fusion. For the apparatus shown in FIGURE 5, dies of 6″ to 21″ long have been used successfully. Longer or shorter dies may be used as well, depending upon the production rate desired and the shape of the finished product. Short dies are successfully operated at temperatures approaching 500° F., and these exert the minimum back pressure on the system. A die is too short when it becomes impossible to fully fuse the product and swelling occurs. Long dies must be operated at lower temperatures to prevent scorching and, as expected, exert a higher back pressure on the system. The longer dies, however, help stabilize the operation thus making a die of medium length the most desirable choice. The actual length depends upon the cross-sectional area employed.

When operating properly, the end product should be fully fused, just a short interval of time before it issues from the die or immediately thereafter. If it becomes fully fused, or softened throughout, much before issuing from the die, the material is likely to revert to viscous flow and lose its shape entirely.

The addition of a lubricant to the plastisol being processed reduces operating pressures substantially and encourages plug flow in the fusing die. Though not essential to the process when simple shapes are involved, the addition of a lubricant is highly advantageous and is sometimes essential for the successful production of very irregularly or intricately shaped plastic products. Metallic stearates and a low melting point polyethylene have been used successfully as lubricants. Achievement of plug type flow and low back pressures may be aided by coating intricate die shapes with "Teflon" (polytetrafluoroethylene), or with other permanent mold-releasing materials.

To complete the process, a water cooling bath 19 and a wind-up drum 20 are shown in FIGURE 5. They operate to receive the product as ejected from the fusing die. Instead of water, other cooling liquids not corrosive to the polyvinyl chloride may be used.

E—Application to Fabric

The plastisol paste of the invention may be employed in a process of imparting a flexible plastic coating to fabrics by employing suitable spreading heads at the end of the solvating tube to spread the paste onto a moving fabric.

Figure 7A:
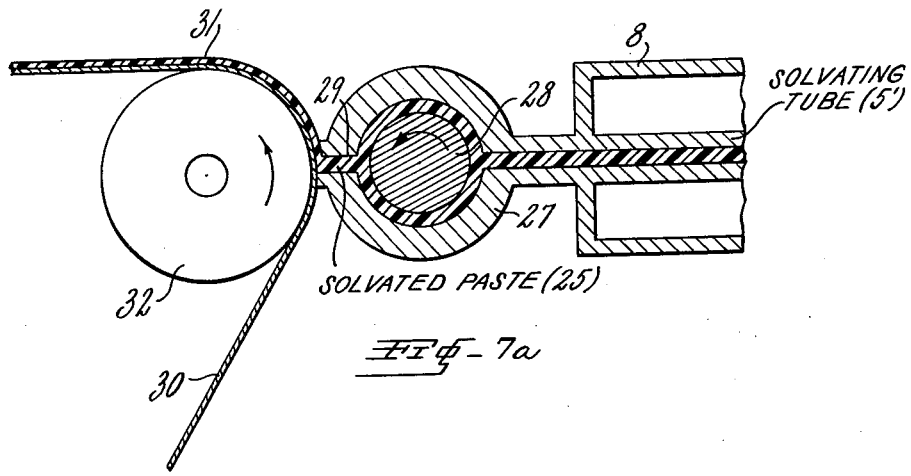
FIG. 7a shows the same, partially in vertical cross-section, with means for applying solvated plastisol to fabric sheeting.

FIGURE 6 shows a spreading head for applying a plastic lining to a woven hose. Small clearances insure viscous flow. FIGURE 7 illustrates a spreading head for coating a flat fabric. Agitation of the paste in each case must be insured to prevent premature gelation. The spreading head must be maintained at the same temperature as the solvating chamber for satisfactory operation. Viscous flow is accomplished by the rotation of the mandrel in the spreading head which imparts a shearing action to the plastisol as it passes therethrough.

Referring to FIGURE 6, solvated paste 25 coming from the solvating tube 5′ is forced outwardly through the conical space between the braiding pin 22 and spreading pin 24. Concurrently, a woven hose jacket 23 is produced by a hose braider 21 or loom which forms a woven jacket 23 on a continuous basis on the braiding pin 22 which, as shown, is actually the end of the steam jacketed 8 solvating tube 5′. When properly synchronized, plastisol paste is spread in a continuous layer on the internal diameter of the forward moving hose jacket 23. The land on the spreading pin 24 stabilizes the spreading operation.

Once deposited on the hose jacket, the solvating paste sets up to a stiff gel and neither drips nor flows to disrupt the uniform nature of the lining applied. The operation can be run successfully, therefore, either horizontally or vertically as shown.

The gelled lining is fused by the application of additional heat to the hose construction following the spreading operation. Radiant heaters 26 can be used for the purpose or the hose can be directed through a hot air oven with equal success. The fused lining is mechanically bonded to the woven jacket because the paste is initially forced into the jacket fibers at the spreading head.

Fabric sheeting can be coated with flexible polyvinyl chloride by using a spreading head of the type shown in FIGURE 7. In this case, the solvated paste 25 is pumped into a cross head 27 equipped with a rotating driven shearing roll 28 which prevents premature gelation from occurring. The paste is subsequently forced through a small slot in the cross head, referred to as the coating die 29 and is spread on the fabric 30 coming from a fabric let-off as the fabric is then directed past the die 29 over a positioning roll 32. The paste sets to a gel on the coated fabric 31 and is eventually fused to the fabric by passing the coated material through an oven.

It should be noted here that the properties of the paste as applied to the fabric are not as variable as are the properties of the initial room temperature plastisol mix. Also, the paste is considerably more viscous. Because of this situation, paste can be effectively applied to a wider selection of fabrics and bonding can be controlled by suitably manipulating the coating pressure. Coating pressures can be controlled by regulating the speed and position of the positioning roll relative to the pumping rate and cross head, respectively.

It will be apparent from the above, that plastisol paste can also be applied to the outer surface of a woven hose, as well as to other fabric shapes, e.g., electrical cord foundations. Also, fabrics can be coated on two sides simultaneously. It is also possible to fuse a coated fabric within the confines of a fusing die as described under D above.

For example, as shown in cross-section in FIGURE 8, a die is shown for coating solvated paste on the outer surface of the woven hose or electrical cord foundation. The item to be coated is driven (forced) through the die by pinch rolls 33. Solvated paste from the solvating tube is pumped into the cavity of the die 34, having an annular cavity 35, and is distributed by the rotation of the hollow pin 36 which is fixed to the gear 37 which meshes with the driven pinion 38 on the driving shaft 39. The solvated paste issues as a coating on the passing items to be coated, and is finished by passing through a fusing oven (not shown) followed by cooling in a water bath. In case the die lands 40, shown, are extended several inches and high heat applied thereto, fusing would then take place within the confines of the fusing die or die lands.

By weaving the hose prior to its entrance into the hollow pin 36 of the assembly shown, it is possible to add the arrangement previously indicated (FIGURE 6) for lining the hose and thereby coating both inner and outer surfaces.

It is also possible to coat both sides of a fabric by setting up two spreading rolls as illustrated in FIGURE 7, one next to the other and allowing the fabric to pass between them.

While the invention is shown applicable to coating fabric, it could also be used to coat paper, for making vinyl chloride coated paper.

Having thus described our invention, what we claim and desire to protect by Letters Patent is:

1. In the manufacture of plastic articles from a plastisol, the improvement which consists of preparing an ungelled plastisol paste in which the resin particles are rendered substantially fully solvated with the plasticizer by heating the plastisol while simultaneously subjecting it to shear, transferring said paste to a shaping means for shaping said paste into final desired form, shaping said paste in said form and interrupting said shear to permit gelling of the shaped paste prior to any fusing of the mass of gelled plastisol.

2. A method as set forth in claim 1 in which the unshaped paste is introduced into a mold and gelled therein in the form of the final product, and the gelled plastisol is cooled and thereafter fused externally of the mold in the form of the finished article.

3. A method as set forth in claim 1 in which the unshaped paste is introduced into a mold to permit gelling and is fused in final desired form in the mold by the addition of heat to the mold, the fused mass being subsequently cooled and removed in the final desired form of the finished article.

4. A method as set forth in claim 1 in which the unshaped paste is successively introduced into each of a number of molds disposed on a rotatable drum while rotating the drum so that each mold receives its quota of the said paste, then passing the deposited paste through a heating cycle sufficient to fuse the paste in final desired form, the finished articles then being cooled and subsequently removed from each of the drum molds.

5. The method of claim 1, wherein said shear is created by subjecting said paste to flow under pressure.

6. The method of claim 1, wherein said shear is created by agitating the said paste.

7. A continuous process for molding plastisols which comprises continuously forcing a fluid, stabilized plastisol, in which the resin particles are but partially solvated, through a heated solvating zone under conditions to cause turbulent flow and agitation sufficient to keep the plastisol ungelled and fluid while in transit through said zone but forming a fully solvated smearable paste, continuously passing the said paste, with no substantial reduction in its temperature, to a fusing and linear shape-forming die for said paste, wherein the degree of agitation is lessened so as to cause said paste to gel, said die being heated to raise the paste temperature sufficiently to fuse the gelled paste while in transit through the die, and continuously removing the product in desired substantially completely fused linear form, and cooling the shaped product.

8. A continuous process for molding plastisols which comprises continuously forcing a fluid stabilized plastisol, in which the resin particles are but partially solvated, through a heated solvating zone under conditions to cause turbulent flow and agitation sufficient to keep the plastisol ungelled and fluid while in transit through said zone but forming a fully solvated smearable paste, continuously passing said paste, with no substantial reduction in its temperature, to a fusing and linear shape-forming die for said paste, wherein the degree of agitation is lessened so as to cause said paste to gel, said die being heated to raise the paste temperature sufficiently to fuse the gelled paste while in transit through the die, and continuously removing the product in desired substantially completely fused linear form, and cooling the shaped product, the whole operation being carried out with substantially no interruption in the flow of the product from its introduction until its exit as a shaped body.

9. A method which comprises uninterruptedly and forcibly feeding a fluid ungelled polyvinyl plastisol, in which the resin particles are but partially solvated to a heated solvating zone, under imposed agitation sufficient to agitate and keep the plastisol ungelled and fluid while in transit through said zone, passing the fluid but substantially fully solvated paste issuing from said zone to an elongated fusing and linear shape-forming die with no substantial reduction in the temperature of the fully solvated paste, heating the paste to arrest agitation so as to cause said paste to gel while in transit through said die, the temperature being sufficient to fuse the gelled polyvinyl mixture and then uninterruptedly issuing and withdrawing the elongated fused polyvinyl mixture in its final desired linear shape which incorporates the exact inner dimension of the shaping die, and thereafter cooling the shaped product.

10. A method which comprises uninterruptedly and forcibly feeding a fluid ungelled polyvinyl plastisol, in which the resin particles are but partially solvated, to a heated solvating zone, under imposed agitation sufficient to agitate and keep the plastisol ungelled and fluid while in transit through said zone, passing the fluid but fully solvated and ungelled paste issuing from said zone to a spreading means for said paste, the temperature of the paste being maintained substantially at the temperature of its solvation in the solvating zone, spreading the paste onto a moving fabric and allowing the paste to gel on the fabric by refraining from further agitation of the paste while said fabric is in transit, and subjecting the coated fabric to an elevated temperature sufficient to fuse the gelled coating in place on the fabric while it is in transit.

11. A process as set forth in claim 10 in which the fluid but fully solvated and ungelled paste is spread on both sides of the fabric.

12. A method which comprises uninterruptedly and forcibly feeding a fluid ungelled polyvinyl plastisol, in which the resin particles are but partially solvated, to a heated solvating zone, under imposed agitation sufficient to agitate and keep the plastisol ungelled and fluid while in transit through said zone, passing the fluid but fully solvated and ungelled paste issuing from said zone to a spreading means for said paste, the temperature of the paste being maintained substantially at the temperature of its solvation in the solvating zone, spreading the paste onto a moving paper sheet and allowing the paste to gel on the paper sheet by refraining from further agitation of the paste while said sheet is in transit, and subjecting the coated paper to an elevated temperature sufficient to fuse the gelled coating in place on the paper while it is in transit.

References Cited in the file of this patent

UNITED STATES PATENTS

| | | |
|---|---|---|
| 2,154,333 | Kampfer | Apr. 11, 1939 |
| 2,365,374 | Bailey | Dec. 19, 1944 |
| 2,413,735 | Shabeker | Jan. 7, 1947 |
| 2,417,293 | D'Alelio | Mar. 11, 1947 |
| 2,417,294 | D'Alelio | Mar. 11, 1947 |
| 2,447,056 | Cooper | Aug. 17, 1948 |
| 2,471,752 | Ingmanson | May 31, 1949 |
| 2,528,506 | Foye | Nov. 7, 1950 |
| 2,624,914 | Rhodes | Jan. 13, 1953 |
| 2,644,983 | Curtiss | July 14, 1953 |
| 2,740,161 | Rubens et al. | Apr. 3, 1956 |
| 2,855,631 | Rowley | Oct. 14, 1958 |

OTHER REFERENCES

Baird: "P.V.C. Paste," British Plastics, April 1948, pp. 167–171.

Sirota: "Dispersion Coatings," Organic Finishing, Vol. 11, No. 12, December 1950, pp. 11–15 relied upon.

"Presenting Plastigels," Bakelite Review, January 1952, pp. 3–5 relied upon.